(12) United States Patent
Mudgil et al.

(10) Patent No.: US 11,620,309 B2
(45) Date of Patent: Apr. 4, 2023

(54) DATA RECONCILIATION AND INCONSISTENCY DETERMINATION FOR POSTED ENTRIES

(71) Applicant: Tekion Corp, Pleasanton, CA (US)

(72) Inventors: Satyavrat Mudgil, Bengaluru (IN);
Anant Sitaram, San Ramon, CA (US)

(73) Assignee: Tekion Corp, Pleasanton, CA (US)

( * ) Notice: Subject to any disclaimer, the term of this patent is extended or adjusted under 35 U.S.C. 154(b) by 0 days.

(21) Appl. No.: 17/525,703

(22) Filed: Nov. 12, 2021

(65) Prior Publication Data

US 2022/0261421 A1 Aug. 18, 2022

Related U.S. Application Data

(63) Continuation of application No. 17/175,277, filed on Feb. 12, 2021, now Pat. No. 11,204,944.

(51) Int. Cl.
*G06F 16/00* (2019.01)
*G06F 16/27* (2019.01)
(Continued)

(52) U.S. Cl.
CPC ........ *G06F 16/273* (2019.01); *G06F 16/2272* (2019.01); *G06F 16/2365* (2019.01);
(Continued)

(58) Field of Classification Search
CPC .. G06F 16/273; G06F 16/285; G06F 16/2272; G06F 16/252; G06F 16/254; G06F 16/2365
(Continued)

(56) References Cited

U.S. PATENT DOCUMENTS 11,204,944 B1 12/2021 Mudgil et al.
2005/0015712 A1* 1/2005 Plastina .................. G06F 16/48
715/230

(Continued)

FOREIGN PATENT DOCUMENTS

KR 10-1653268 B1 9/2016

OTHER PUBLICATIONS

United States Office Action, U.S. Appl. No. 17/175,277, dated May 13, 2021, 9 pages.

(Continued)

*Primary Examiner* — Chelcie L Daye
(74) *Attorney, Agent, or Firm* — Fenwick & West LLP

(57) ABSTRACT

A system and a method are disclosed for receiving an entry, the entry comprising first content and a metadata tag corresponding to a classification, the first content populated by a first source. A rules engine determines that the first content comprises a data field associated with at least one of a plurality of reconciliation policies. Responsive to determining that the first content comprises a data field associated with at least one of the plurality of reconciliation policies, the rules engine selects a reconciliation policy based on the metadata tag. The rules engine retrieves, from a second source, second content associated with the data field, inputs the first content and the second content into a model, the model selected based on the reconciliation policy, the model generating an output, and performs a remediation action based on the output.

20 Claims, 7 Drawing Sheets

(51) Int. Cl.
  *G06F 16/28*  (2019.01)
  *G06F 16/23*  (2019.01)
  *G06F 16/25*  (2019.01)
  *G06F 16/22*  (2019.01)

(52) U.S. Cl.
  CPC .......... *G06F 16/252* (2019.01); *G06F 16/254* (2019.01); *G06F 16/285* (2019.01)

(58) Field of Classification Search
  USPC ................................................ 707/610, 690
  See application file for complete search history.

(56) References Cited

U.S. PATENT DOCUMENTS

| | | |
|---|---|---|
| 2012/0136965 A1 | 5/2012 | Matz |
| 2014/0029615 A1 | 1/2014 | Baldwin et al. |
| 2015/0149420 A1* | 5/2015 | Lee ..................... G06F 16/2365 |
| | | 707/690 |

OTHER PUBLICATIONS

International Search Report and Written Opinion, Patent Cooperation Treaty Application No. PCT/US2022/015150, dated May 16, 2022, 12 pages.

\* cited by examiner

600

602
receive, from a source of a plurality of candidate sources, a payload comprising content and metadata

604
select a destination to which to route the payload based on the source and the content

606
generate an entry at the destination based on the content

608
input the metadata into a classification engine

610
receive, as output from the classification engine, one or more classifications for the payload

612
apply a metadata tag to the entry, the metadata tag indicating the one or more classifications

614
receive a search request from a client device specifying at least one of the one or more classifications

616
in response to receiving the search request, provide the entry to the client device based on a matching classification

702
receive an entry, the entry comprising first content and a metadata tag corresponding to a classification, the first content populated by a first source

↓

704
determine that the first content comprises a data field associated with at least one of a plurality of reconciliation policies

↓

706
responsive to determining that the first content comprises a data field associated with at least one of the plurality of reconciliation policies, select a reconciliation policy based on the metadata tag

↓

708
retrieve, from a second source, second content associated with the data field

↓

710
input the first content and the second content into a model, the model selected based on the reconciliation policy, the model generating an output

↓

712
perform a remediation action based on the output

FIG. 7

DATA RECONCILIATION AND INCONSISTENCY DETERMINATION FOR POSTED ENTRIES

CROSS REFERENCE TO RELATED APPLICATIONS

This application is a continuation of co-pending U.S. application Ser. No. 17/175,277, filed Feb. 12, 2021, which is herein incorporated in its entirety by reference.

TECHNICAL FIELD

The disclosure generally relates to the field of data classification, and more particularly relates to enabling granular entry search functionality based on metadata tagging.

BACKGROUND

Existing systems that convert user-input information into posted entries may face constraints, such as regulatory constraints, that impose structure. These imposed structures hamper ability to search or otherwise manipulate posted entries in manners that may be meaningful to users. For example, these imposed structures limit information that may be included in a posted entry, and additionally limit how permissible information can be derived. Yet further, the manner in which conversion is performed is itself rigid, and prone to error, as these systems require human users to manually select logic for performing the conversion that may be sub-optimal for doing so. Where error occurs, reconciliation is difficult or impossible to perform because the rigidity of the existing systems does not enable a mapping of converted data to ground truth sources.

SUMMARY

Systems and methods are disclosed herein for enabling flexible rules to be applied with respect to generating and manipulating posted entries, including posted entries that are subject to constraints. A data management system may be instantiated that determines how to route payloads that are intended to result in posted entries. The data management system may use metadata of the payload to classify the payload, and may apply metadata tags that assist with search functionality and other manipulation. After entries are posted, posted entries may be selectively applied to reconciliation policies depending on the content of those posted entries, where applicable reconciliation policies are selected based on a metadata tag. Reconciliation may be performed using a model, where a remediation action is determined to be performed based on output of the model.

In an embodiment, a data management system receives, from a source of a plurality of candidate sources, a payload comprising content and metadata. For example, the plurality of candidate sources may include different computing devices of a client, each computing device serving at least one different dedicated function. In an embodiment, each of the plurality of candidate sources generate payloads based on input into respective, different user interfaces. The data management system selects a destination to which to route the payload based on the source and the content. For example, the data management system may consult a decision tree that shows, based on the computing device from which the payload was received, and at least some of the content of the payload, to where the payload is to be routed.

In an embodiment, the destination is selected by selecting a root of a plurality of candidate root based on the source, where each candidate root corresponds to a different one of the plurality of candidate sources, and then selecting a leaf of the root, of a plurality of candidate leaves, based on the content, where the leaf corresponds to the destination.

The data management system generates an entry at the destination based on the content (e.g., by posting an entry to a searchable database).

The data management system inputs the metadata into a classification engine, and receives, as output from the classification engine, one or more classifications for the payload. In an embodiment, the classification engine identifies the one or more classifications by comparing the metadata to entries of a database, the entries corresponding candidate metadata to corresponding classifications. In another embodiment, the classification engine is a machine learning model that takes the metadata as input and outputs probabilities corresponding to candidate classifications. In such an embodiment, when receiving the one or more classifications for the payload, the data management system may optionally receive the probabilities, identifies one or more respective probabilities that meet or exceed a threshold, and selects the one or more candidate classifications based on their respective probabilities having met or exceeded the threshold. The machine learning model may be trained using training data comprising combinations of metadata paired with labels, the labels indicating a classification corresponding to the combinations of metadata.

The data management system applies a metadata tag to the entry, the metadata tag indicating the one or more classifications. The data management system receives a search request from a client device specifying at least one of the one or more classifications. In response to receiving the search request, the data management system provides the entry to the client device based on a matching classification. In an embodiment, generating the entry comprises determining a discrepancy between a value stored at the destination, and a corresponding value shown within the contents, and providing the entry to the client device comprises providing an identification of the discrepancy.

In an embodiment, following entry generation, a data management system receives an entry, the entry comprising first content and a metadata tag corresponding to a classification, the first content populated by a first source. The data management system determines that the first content includes a data field associated with at least one of a plurality of reconciliation policies. For example, the data management system may reference a mapping of content to policies, and responsive to finding a mapped policy to content of the entry, may determine that a reconciliation policy applies. Responsive to determining that the first content comprises a data field associated with at least one of the plurality of reconciliation policies, the data management system selects a reconciliation policy based on the metadata tag.

The data management system retrieves from a second source, second content associated with the data field. For example, the second source may be a source of ground truth on what a content value should be. The data management system may input the first content and the second content into a model, the model selected based on the reconciliation policy, the model generating an output. The data management system performed a remediation action based on the output. In an embodiment, the remediation action includes the data management system determining, based on the output, a destination for an alert, and routing the alert to the destination. In an embodiment, the data management system determines whether the output matches an alert condition, and transmits an alert to a user responsive to determining that the output matches the alert condition. In such an embodiment, responsive to determining that the output does not match the alert condition, the data management system stores data representative of the output to memory. The data representative of the output may be indexed and searchable.

In an embodiment, the remediation action includes generating a plurality of alerts, the parameters of each alert determined based on the reconciliation policy, each alert differing from each other alert. The routing engine routes each of the plurality of alerts to different destinations, each destination determined based on the reconciliation policy.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6 illustrates one embodiment of an exemplary flowchart for a process for generating and providing for generating an entry for posted data and searching for the entry.

FIG. 7 illustrates one embodiment of an exemplary flowchart for a process for reconciling a data field in a posted entry.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Data Management System Environment

Figure 1:
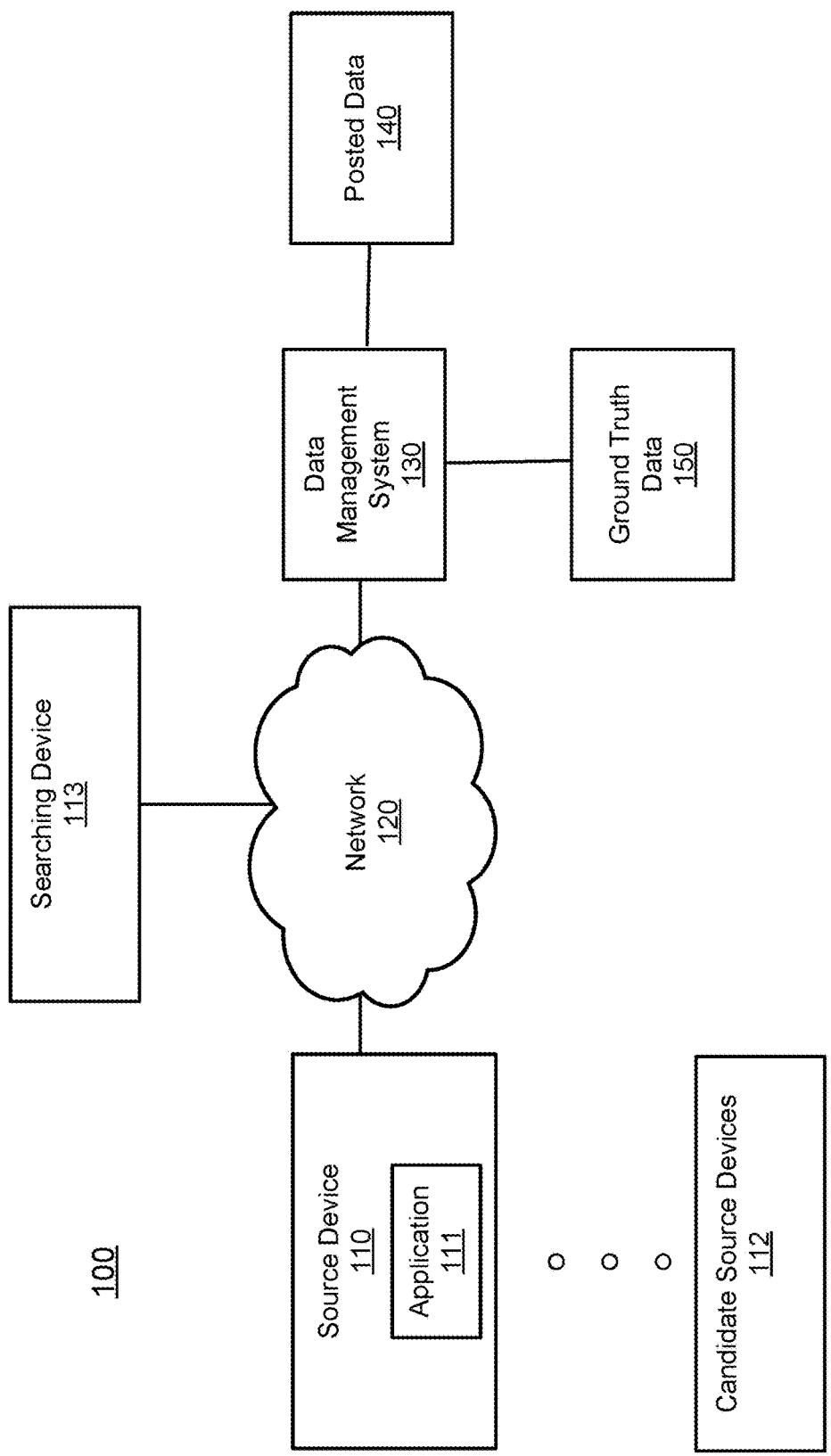
FIG. 1 illustrates one embodiment of a system environment of a data management system facilitating posting, reconciliation, and searching of data.

FIG. 1 illustrates one embodiment of a system environment of a data management system facilitating posting, reconciliation, and searching of data. Environment 100 includes source device 110, application 111, candidate source devices 112, searching device 113, network 120, data management system 130, posted data 140, and ground truth data 150. Candidate source devices 111 include source device 110. Candidate source devices 111 are client devices. Client devices may include any device having a user interface operable by a user to communicate with data management system 130. For example, a client device may be a mobile device (e.g., smartphone, laptop, tablet, personal digital assistant, wearable device, internet-of-things device, and so on), a larger device (e.g., a personal computer, kiosk, and so on), or any other device capable of operating application 111. Candidate source devices 112 may, for example, be client devices that are associated with different entities. In one example where environment 100 represents a system environment of a vehicle dealership, candidate source devices 112 may include devices associated with a repair department, an inventory department, and so on.

Application 111 may be installed on any client device, and may be used to interface a user of a client device with data management system 130. Application 111 may be a dedicated application, provided to a client device via data management system 130. Alternatively, application 111 may be a browser application through which a user may navigate to a portal to interface with data management system 130. Application 111 may perform some or all functionality of data management system 130 on-board a client device. Further details about the functionality of application 111 will be described below with respect to data management system 130.

Searching device 113 is a client device that is enabled (e.g., using application 111) to search entries within posted data 140. Searching device 113 may be a device of candidate source devices 112 or may be a separate client device. Particulars about searching are described in further detail below with reference to FIGS. 2 and 3.

Network 120 facilitates communication between client device 110 and search service 130. Network 120 may be any network, such as a local area network, a wideband network, the Internet, and any other type of network.

Data management system 130 receives a payload from source device 110 via network 120, and selects a destination for the payload depending on which candidate source device 112 originated the payload, and based on the content of the payload. Data management system 130 generates entries depending on the selected destination for the payload, and posts the generated entries to posted data 140. As used herein, the term post may refer to an action that renders an entry searchable by searching device 113. Data management system 130 may also reconcile information in posted data 140 depending on a reconciliation policy associated with the information. Data management system 130 may perform such reconciliation against ground truth data 150. Data management system 130 may facilitate search requests received via searching device 113. Further information about the entities shown in FIG. 1 are described in further detail below with reference to FIGS. 2-4 and FIGS. 6-7.

Figure 2:
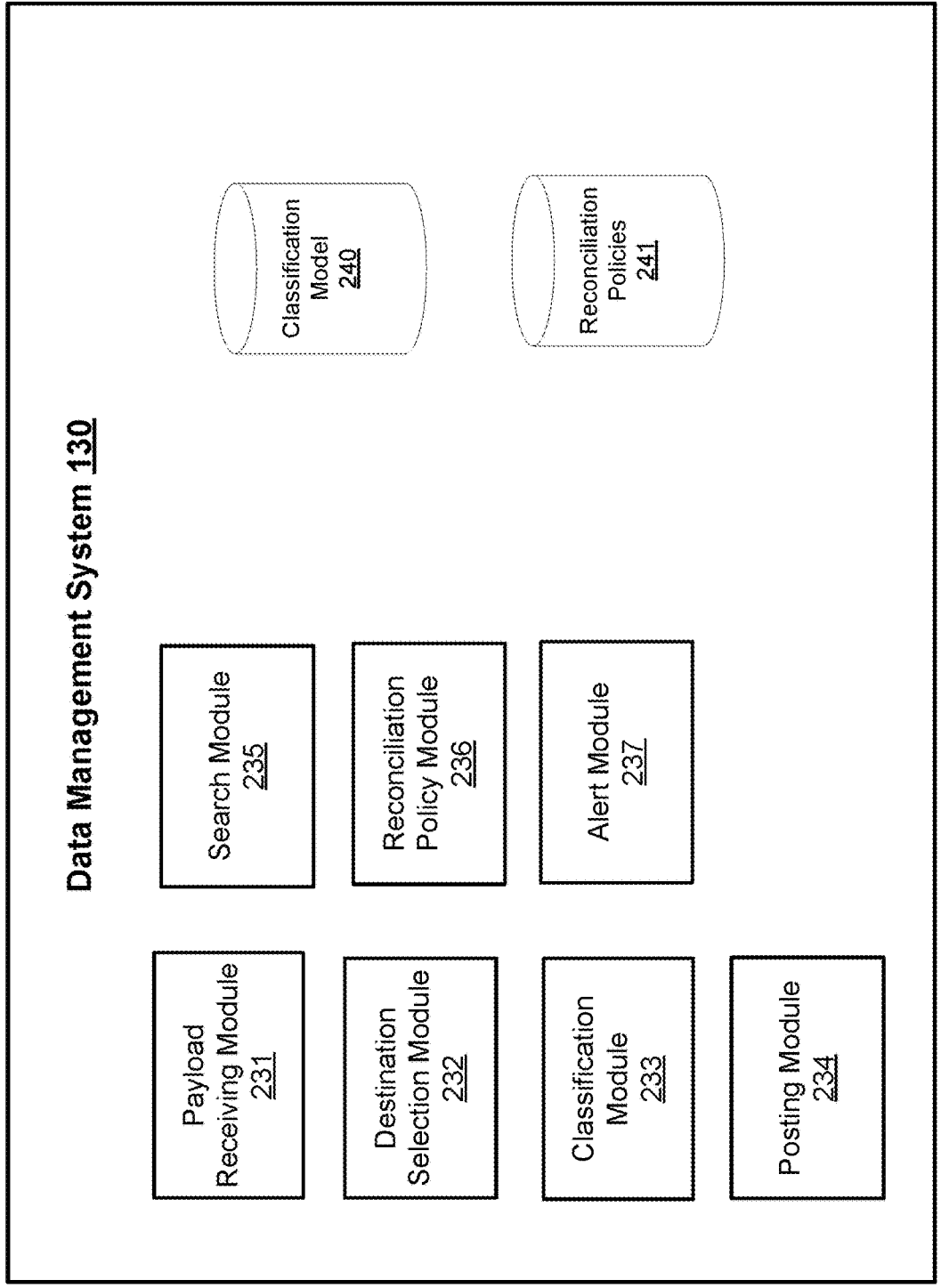
FIG. 2 illustrates one embodiment of exemplary modules used by the data management system.

FIG. 2 illustrates one embodiment of exemplary modules used by the data management system. As depicted in FIG. 2, data management system 130 includes payload receiving module 231, destination selection module 232, classification module 233, search module 234, search module 235, reconciliation policy module 236, alert module 237, classification model 240, and reconciliation policies 240. The modules and databases shown in FIG. 2 are merely exemplary; fewer or more modules and databases may be used to perform the functionality of data management system 130 disclosed herein. Moreover, the modules and databases described with respect to data management system 130 may in part or in full be instantiated on any client device (e.g., in whole or in part within application 111).

Payload receiving module 231 detects payloads transmitted from candidate source devices 112 and received by data management system 130. The term payload, as used herein, may refer to data input by a user (e.g., using application 111) and associated metadata that together is used to generate an entry, the entry to be posted to posted data 140. For example, if the source device 110 is a device used by a service department of a vehicle dealership, the data input by the user may include information about a service job, such as the type of job being done (e.g., oil change). The input data may include any other information describing the vehicle, the owner of the vehicle and so on. Data specifically input by a user is referred to interchangeably herein as content of the payload.

Metadata may be derived by application 111 and/or payload receiving module 231. The metadata may include information associated with the source device 110. The metadata may include information associated with any data input by the user (e.g., whether the job is open or closed, a type of job, a location description associated with the job, and so on). Exemplary metadata includes a type of interaction, demographics about humans associated with an entry, and so on. In the exemplary context of a vehicle dealership, the metadata may include an associated category of the entry (e.g., repair order, vehicle inventory change, etc.), demographic information about humans involved with the entry (e.g., age information of a vehicle owner), timing information (e.g., hours worked by a technician toward solving a request), and so on.

In an embodiment, application 111 generates the payloads. Application 111 may populate a different user interface for one or more different ones of candidate source devices 112. For example, candidate source devices 112 may correspond to different departments of an organization (e.g., the different departments of a vehicle dealership mentioned above). Application 111 may generate for display one or more of different candidate user interfaces for a given source device 110, depending on which department the source device 110 corresponds. Application 111 may generate the payload to have metadata and content corresponding to the user interface used.

In an embodiment, payload receiving module 231 bifurcates the content and the metadata, and transmits the content and the metadata separately to modules of data management system 130 that process these features. Alternatively, payload receiving module 231 does not bifurcate the content and the metadata. Payload receiving module 231 may store the content and the metadata to temporary memory for reference by other modules of data management system 130. Payload receiving module 231 may purge the data after an entry is generated and/or posted (e.g., responsive to an expiration time elapsing, or responsive to determining that an entry is generated and/or posted).

Destination selection module 232 selects a destination for the payload. The term destination as used herein may refer to a data structure location, the data structure dictating a structure of an entry to be generated from the payload. Destination selection module 232 may select a destination to route the payload based on the source and the content of the payload. In and embodiment, destination selection module 232 accesses a decision tree to select a destination to route the payload. The tree may have several roots, each corresponding to a source of the payload. The term source, as used herein, may refer to a logical segment of an enterprise.

Following the vehicle dealership example, different sources may include a repairs department, an inventory management department, and so on. Different ones of candidate source devices 112 may be associated with different sources. Alternatively, different login credentials to application 111 may be associated with different sources, thus linking users accounts to sources, rather than specific devices. Where a payload originates from source device 110, destination selection module 232, such an embodiment, may determine a source corresponding to source device 110. Destination selection module 232 may then select a root of the decision tree corresponding to that source.

Following from the root of the decision tree, destination selection module 232 may identify content of the payload, and may identify a leaf that corresponds to the identified content. For example, the identified content may be a field, option, keyword, or any other data input or otherwise selected by the user when generating the payload. The identified leaf may be selected as either a destination or as a next hop along a route to the destination. This process may continue, where subsequent leaves are selected based on the content of the payload, until a final leaf is identified, the final leaf corresponding to a destination of the payload. This process is described in further detail with respect to FIG. 4.

In an embodiment, destination selection module 232 may select a destination for the payload by inputting the determined source of the payload, and contents of the payload, into a machine learning model. The machine learning model may output an identification of the destination. Destination selection module 232 may select the destination for the payload based on the output of the machine learning model. The machine learning model may be trained using a data set that pairs historical payloads and their sources to destinations to which the payloads were routed.

Classification module 233 classifies the payload based on the metadata of the payload. In an embodiment, classification module 233 classifies the payload by comparing the metadata to entries of a database (e.g., classification model 240). The database entries map candidate metadata that might be included in a payload to one or more corresponding classifications. For example, if the metadata indicates that, for a payload generated by a source device 110 of a service department of a vehicle dealership, that the payload corresponds to an incomplete repair task, this might be compared to an entry that maps possible states of completion of repair tasks to classifications (e.g., "not yet started," "work in progress," "complete"). In this exemplary scenario, classification module 233 would classify the incomplete repair task as "work in progress" where the metadata indicates that some activity has begun toward the repair task, but the repair task remains incomplete.

In an embodiment, classification module 233 classifies the payload by inputting the metadata into a machine learning model (e.g., where classification model 240 is a machine learning model) and receiving output from the machine learning model. The output of the machine learning model may directly classify the metadata. Alternatively, the output of the machine learning model may include probabilities corresponding to candidate classifications. In such an embodiment, the output may be limited to probabilities that exceed a certain threshold (e.g., a static threshold, such as 50%, or a dynamic threshold, such as within a certain range of a candidate probability having a highest probability relative to the other candidate probabilities).

Classification module 233 may identify one or more of the output probabilities that meet or exceed a threshold, and may select the corresponding candidate classifications that meet or exceed that threshold. As an example, the machine learning model may output, for a payload having metadata corresponding to a vehicle service department entry, a 70% probability that the metadata corresponds to a repair that is complete, a 40% probability that the metadata corresponds to a warranty issue, and a 20% probability that the metadata corresponds to an action to be taken with respect to a particular human being. Where the threshold is 35%, classification module 233 would responsively classify the payload as corresponding to a repair that is complete, as well as corresponding to a warranty issue.

Where classification is performed using a machine learning model, the model may be trained using training data. The training data may include various combinations of metadata as paired with labels, the labels indicating one or more classifications corresponding to the combinations of metadata. The training data may be manually labeled, or may be derived from historical data where payloads were manually classified, and where a processor determined the metadata corresponding to those manually classified payloads, whereby the processor generated a metadata-label pair for the determined corresponding metadata. Throughout this disclosure, the term "classification engine" where used may refer to one or both of the classification module 240 and/or classification module 233.

Posting module 234 generates and posts entries to posted data 140. Posting module 234 includes at least a portion of the content of the payload in the entries. Posting module 234 tags each entry with a corresponding one or more classifications that were applied to the payload. Posting module 234 updates an index as entries are posted, mapping the posted entries to one or more of search terms such as keywords and classifications. The index renders posted data 140 searchable by a searching device 113.

In an embodiment, posting module 234 determines that an existing posting of posted data 140 has data in conflict with the payload. For example, an inventory department may have caused a posting to be generating reflecting inventory of a replacement component decremented by two in connection with a particular repair job identifier. A payload from a service department indicating three replacement components were used with respect to that same particular repair job identifier would be in conflict with the posting of the inventory department. In such an embodiment, posting module 234 may, prior to posting the data, prompt a user of source device 110 to confirm the contents of the payload. The prompt may indicate a description of the conflict.

Search module 235 receives search terms from searching device 113 (e.g., via application 111). The search terms may include free text, selection of selectable options (e.g., from a drop-down menu or using radio buttons), or any other means of entering a search term. The search terms may include keywords (e.g., terms that may be found within data fields of entries), and/or may include classifications (e.g., classifications that may match tagged classifications of posted entries). The search terms may additionally include any desired filtering parameters (e.g., only search for a given keyword within a given field of any candidate entries). Search module 235 queries posted data 140 for matching entries, and provides one or more matching entries to searching device 113 (e.g., via application 111). Further description of an exemplary user interface through which search terms are received is described below with respect to FIG. 3.

Reconciliation policy module 236 detects receipt of an entry (e.g., an entry posted to posted data 140). The entry may include content, and may also include a metadata tag corresponding to a classification (e.g., as generated using classification module 233 based on the content populated by source device 110 into application 111 in creating the payload). Reconciliation policy module 236 may determine whether the first includes a data field associated with at least one of a plurality of reconciliation policies. For example, some data fields may not be associated with a reconciliation policy because they are unlikely to contain errors, or any errors may be immaterial to a posting. Other data fields might be associated with a reconciliation policy because they are prone to error. In the context of a vehicle dealership, being prone to error might mean that there is inconsistent data from two different branches with respect to a given item. For example, a data field that might be associated with a reconciliation policy may include an amount of time devoted to a job by a technician (e.g., as populated by a service department), as this may need to be reconciled against consideration due to the technician for work done thus far by the technician. This might be contrasted against rote information (e.g., demographic information, a job ID, etc.), where error is immaterial and there may not be a context against which to reconcile entered data. Associating a data field with a reconciliation policy may be performed manually by an administrator.

Responsive to determining that the first content comprises a data field associated with at least one of the plurality of reconciliation policies, reconciliation policy module 236 may select a reconciliation policy based on the metadata tag of the entry. For example, a given data field may be associated with one, or multiple, reconciliation policies. Depending on which tags are used to classify the entry, reconciliation policy module 236 may select the one or more associated reconciliation policies to be used on at least a portion of the content of the entry. For example, again returning to the vehicle dealership example, different tags may include whether a service job is complete versus a work-in-progress, whether the service job is done to prepare a new vehicle or service a used vehicle, and so on. Each of these different tags may correspond to a different reconciliation policy, and multiple reconciliation policies may apply to an entry. For example, where an entry is both tagged as a work-in-progress and as being for a new vehicle, reconciliation policies for work-in-progress (e.g., ensuring a service technician receives partial consideration for work done in the given posting period by reconciling against an entry from another department that manages reconciliation policies) and new vehicles (e.g., ensuring inventory count is not yet decremented where a job is incomplete) may be selected.

Reconciliation policy module 236 retrieves, from another source, content associated with the data field. The another source, as well as the content, that is retrieved from the secondary source, is determined based on the policy. For example, a policy might dictate that the content of the entry be compared to content of another entry of posted data 140 (e.g., content posted from a different department that has a common or associated field). As another example, a policy might dictate that the content of the entry be compared to ground truth data 150. For example, where a particular region where a job is performed dictates the value of a field, then ground truth data 150 may with certainty, based on the region, include a value (or include parameters used to compute a value) that is unequivocally true.

Reconciliation policy module 236 inputs the first content and the second content into a model. The model may be selected based on the reconciliation policy. The model generates an output that is received by reconciliation policy module 236. In an embodiment, the model includes one or more heuristics, such as a comparison and/or matching function used to determine whether the content from the two data fields of the two different sources are consistent with one another. In an embodiment, the model may be a machine learning model that is trained to take at least a portion of the first and second content (e.g., the data field values and/or additional data of the content and/or metadata tags of the entry), and to output either a determination of whether the data fields are consistent with one another or a probability that the data fields are consistent with one another (in the latter case, reconciliation policy module 236 determines, by comparing the probability to a threshold, whether the data fields are consistent with one another).

Data management system 130 performs a remediation action based on the output of the model. In an embodiment where an inconsistency is found between the two data fields, alert module 237 may determine, a destination for an alert, and may route the alert to the destination. Alert module 237 may determine the destination for the alert in any of a variety of ways. In an embodiment, alert module 237 may determine the destination for the alert using on the output of the model. For example, alert module 237 may determine whether the output matches an alert condition. The term alert condition, as used herein, may refer to a condition where an alert to a user is warranted, such as a scenario where an inconsistency is found. Where the output matches the alert condition (e.g., the data is inconsistent), alert module 237 may route the alert to a user device. The specific user device to which the alert is routed may be determined based on the policy (e.g., alert the source device 110 that requested the entry be posted, alert another device (e.g., a device that populated an inconsistent entry and/or some other pre-defined user device or account), or a combination thereof.

Where alert module 237 determines that the output does not match the alert condition, alert module 237 may instead cause data representative of the output to be stored to memory. The data representative of the output may include an indication or metadata tag that the data field has been verified. The data representative of the output may include other information, such as an address of data against which the data field has been verified and parameters of the function used to verify and reconcile the data. The data representative of the output may be indexed and searchable.

In an embodiment, an alert may be displayed to a user, and may include an indication of the inconsistency that caused the alert to be issued. Alert module 237 may prompt the user with the alert. The alert may include selectable options for handling the alert, such as to disregard the alert, to rectify the inconsistency, and so on. Responsive to receiving a selection to disregard the alert, data management system 130 may post the entry to posted data 140 notwithstanding the inconsistency. Responsive to receiving the selection to rectify the inconsistency, the user may indicate how the inconsistency should be dealt with, and data management system may check the modified entry for an inconsistency and perform processing as normal based on the outcome of the check.

In an embodiment, data management system 130 may determine based on activities of a user on application 111 that the user is manually reconciling data. For example, the manual reconciliation may be detected by determining that the user is populating content for entry into a payload, and is also manually accessing entries (e.g., using a search function) of posted data 140 that correspond to the populated content. Responsive to determining that the user is manually reconciling the data, data management system 130 may determine whether a reconciliation policy exists for the data. Data management system 130 may prompt the user with a selectable option recommending that the reconciliation be performed automatically, and, responsive to receiving input indicating to automatically perform the reconciliation, data management system 130 may reconcile the data consistent with the disclosure herein.

Figure 3:
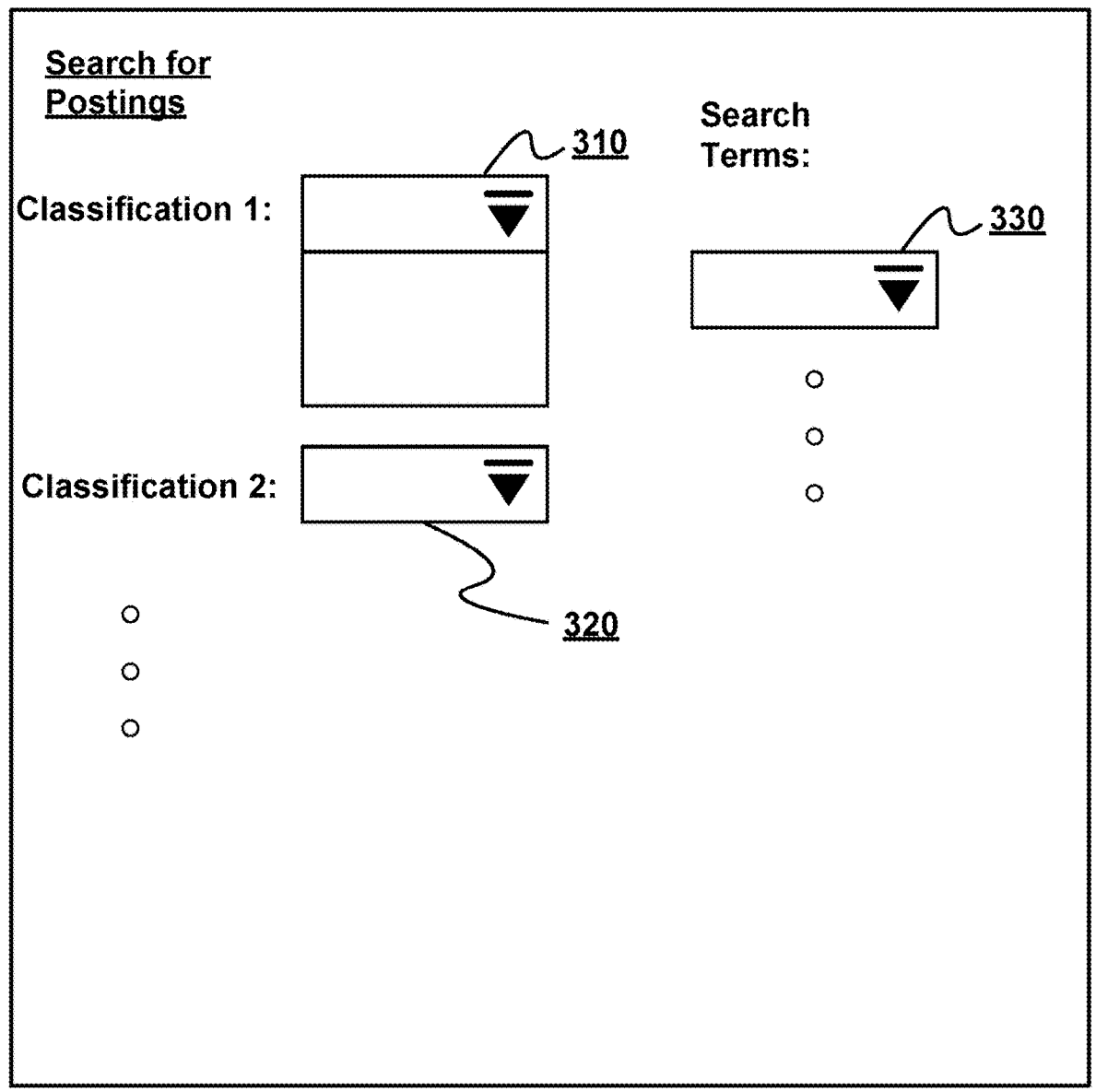
FIG. 3 illustrates one embodiment of a user interface operable by a client device to communicate information for use in searching posted data.

FIG. 3 illustrates one embodiment of a user interface operable by a client device to communicate information for use in searching posted data. User interface 300 may be populated by application 111 of searching device 113, and may be used to search entries of posted data 140. The user may indicate one or more classifications using classification options 310 and 320, and may indicate one or more search terms using search term option 330. While represented using drop-down menus, the user may input data into any option shown in FIG. 3 in any manner, such as by inputting free text, using keywords, selecting terms from a drop down menu, and so on.

Figure 4:
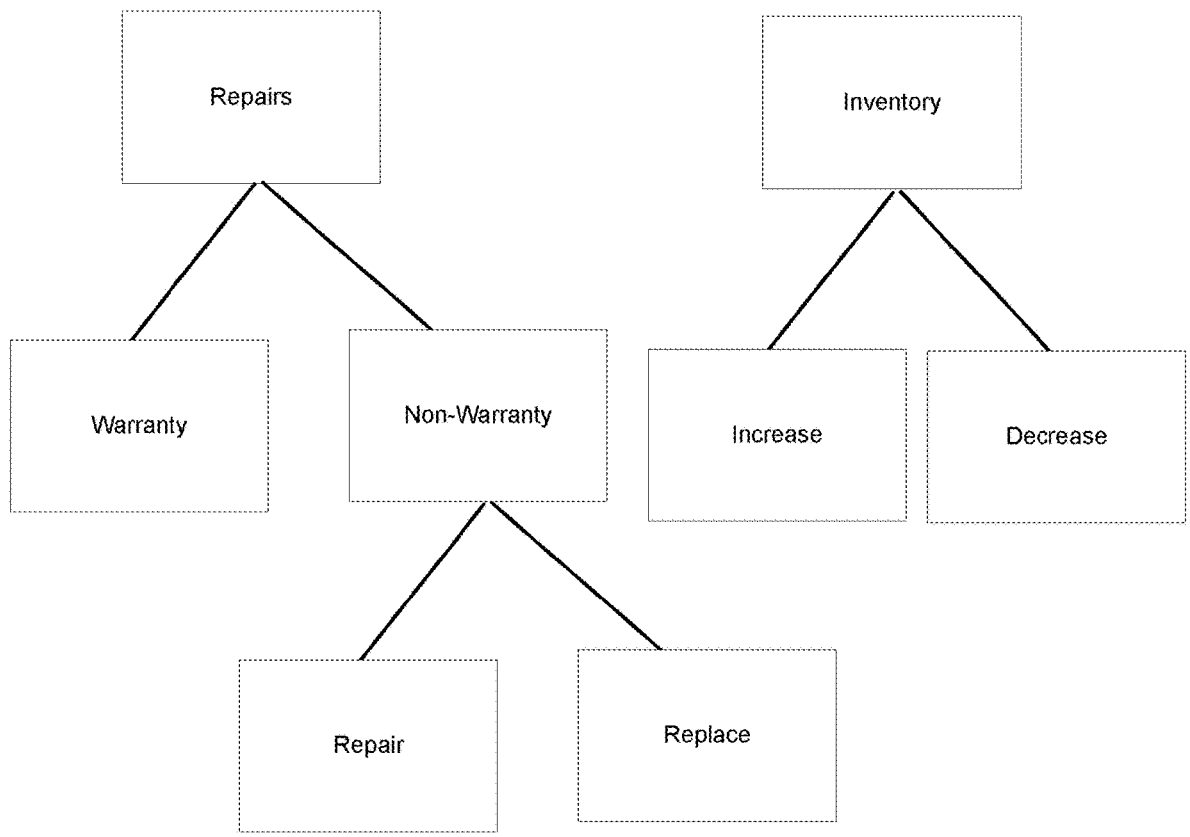
FIG. 4 illustrates one embodiment of an exemplary decision tree for routing a payload to a destination.

FIG. 4 illustrates one embodiment of an exemplary decision tree for routing a payload to a destination. Decision tree 400 shows an exemplary decision tree corresponding to a vehicle dealership scenario. Destination selection module 232 may reference decision tree 400 when determining where to route a payload. Based on the source device 110 from which a payload originated (e.g., by determining whether the device is associated with a repair or inventory department of a vehicle dealership), destination selection module 232 may determine which root of the tree to use—that is, the repairs root or the inventory. Based on content of the payload, destination selection module 232 may identify leaves that correspond to the content, and may ultimately arrive at an end leaf of a tree, which corresponds to the destination.

Computing Machine Architecture

Figure 5:
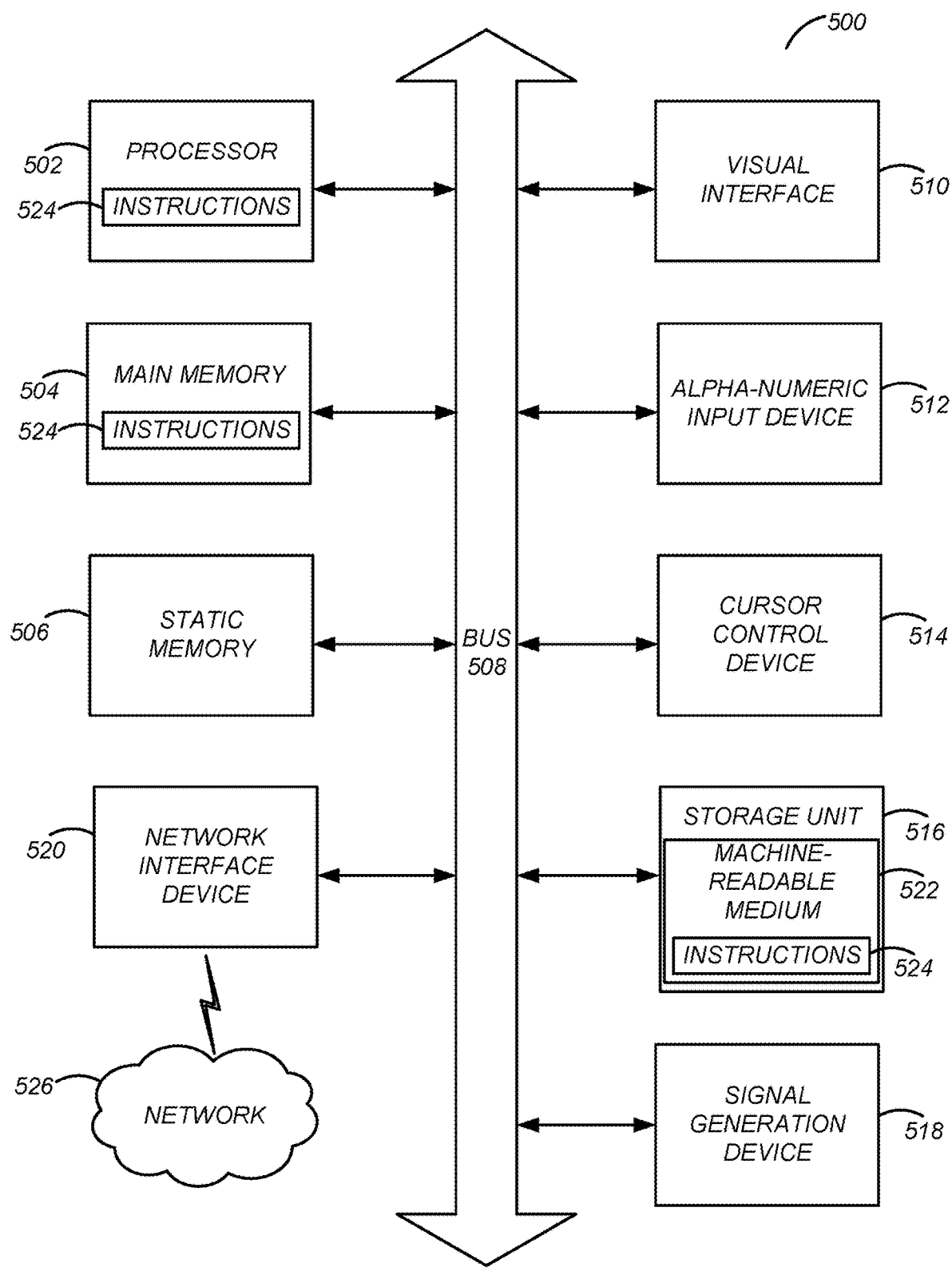
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Exemplary Data Flows for Entry Posting and Reconciliation

FIG. 6 illustrates one embodiment of an exemplary flowchart for a process for generating and providing for generating an entry for posted data and searching for the entry. Process 600 starts with data management system 130 receiving 602, from a source (e.g., source device 110) of a plurality of candidate sources (e.g., candidate source devices 112), a payload comprising content and metadata. Data management system 130 selects 604 a destination to route the payload based on the source and the content (e.g., using destination selection module 232, optionally in connection with decision tree 400). Data management system 130 generates 606 an entry at the destination based on the content (e.g., by posting the entry to posted data 140). Data management system 130 inputs 608 the metadata into a classification engine (e.g., using classification module 233 and classification model 240).

Data management system 130 receives 610, as output from the classification engine, one or more classifications for the payload, and applies 612 a metadata tag to the entry, the metadata tag indicating the one or more classifications. Data management system 130 receives 614 a search request (e.g., via user interface 300) from a client device (e.g., searching device 113) specifying at least one of the one or more classifications. In response to receiving the search request, data management system 130 provides 616 the entry to the client device based on a matching classification (e.g., using search module 235).

FIG. 7 illustrates one embodiment of an exemplary flowchart for a process for reconciling a data field in a posted entry. Process 700 begins with data management system 130 receiving 702 an entry, the entry including first content and a metadata tag corresponding to a classification. For example, the entry may be received using posting module 234. Data management system 130 may determine 704 that the first content includes a data field associated with at least one of a plurality of reconciliation policies, and may responsively select 706 a reconciliation policy based on the metadata tag (e.g., using reconciliation policy module 236). Data management system 130 may retrieve 708, from a second source (e.g., posted data 140 or ground truth data 150), second content associated with the data field. Data management system 130 may input 710 the first content and the second content into a model, the model selected based on the reconciliation policy, the model generating an output. Data management system 130 may perform 712 a remediation action based on the output (e.g., generate and transmit an alert using alert module 237).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:
   receive an entry, the entry comprising a payload having first content, and a metadata tag separate from the payload corresponding to a classification of the first content and describing at least one attribute of the first content, the first content populated by a first source;
   search the payload for a data field within the first content that is associated with at least one of a plurality of reconciliation policies;
   determine that the first content comprises a data field associated with at least one of the plurality of reconciliation policies;
   responsive to determining that the first content comprises a data field associated with at least one of the plurality of reconciliation policies:
      select a reconciliation policy based on the metadata tag; and
      validate the first content against second content from a second source based on the selected reconciliation policy.

2. The non-transitory computer-readable medium of claim 1, wherein the instructions to validate the first content against the second content from the second source based on the selected reconciliation policy comprise instructions to perform a remediation action associated with the selected reconciliation policy.

3. The non-transitory computer-readable medium of claim 2, wherein the remediation action comprises:
   determining, based on the reconciliation policy, a destination for an alert; and
   routing the alert to the destination.

4. The non-transitory computer-readable medium of claim 1, wherein the instructions further comprise instructions to:
   determine a result of the validation matches an alert condition; and
   transmit an alert to a user responsive to determining that the result of the validation matches the alert condition.

5. The non-transitory computer-readable medium of claim 4, wherein the instructions further comprise instructions to, responsive to determining that the result of the validation does not match the alert condition, store data representative of the result of the validation to memory.

6. The non-transitory computer-readable medium of claim 5, wherein the data representative of the result of the validation is indexed and searchable.

7. The non-transitory computer-readable medium of claim 1, wherein the metadata tag is applied to the entry based on the classification of contents of the payload.

8. A method comprising:
   receiving, by a data management system, an entry, the entry comprising a payload having first content, and a metadata tag separate from the payload corresponding to a classification of the first content and describing at least one attribute of the first content, the first content populated by a first source;
   searching, by the data management system, the payload for a data field within the first content that is associated with at least one of a plurality of reconciliation policies;
   determining, by the data management system, that the first content comprises a data field associated with at least one of the plurality of reconciliation policies;
   responsive to determining that the first content comprises a data field associated with at least one of the plurality of reconciliation policies:
      selecting, by the data management system, a reconciliation policy based on the metadata tag; and
      validating, by the data management system, the first content against second content from a second source based on the selected reconciliation policy.

9. The method of claim 8, wherein validating the first content against the second content from the second source based on the selected reconciliation policy comprises performing a remediation action associated with the selected reconciliation policy.

10. The method of claim 9, wherein the remediation action comprises:
    determining, based on the reconciliation policy, a destination for an alert; and
    routing the alert to the destination.

11. The method of claim 8, further comprising:
    determining a result of the validation matches an alert condition; and
    transmitting an alert to a user responsive to determining that the result of the validation matches the alert condition.

12. The method of claim 11, further comprising, responsive to determining that the result of the validation does not match the alert condition, storing data representative of the result of the validation to memory.

13. The method of claim 12, wherein the data representative of the result of the validation is indexed and searchable.

14. The method of claim 8, wherein the metadata tag is applied to the entry based on the classification of contents of the payload.

15. A system comprising:
    memory with instructions encoded thereon; and
    one or more processors that, when executing the instructions, are caused to perform operations comprising:

receiving an entry, the entry comprising a payload having first content, and a metadata tag separate from the payload corresponding to a classification of the first content and describing at least one attribute of the first content, the first content populated by a first source;

searching the payload for a data field within the first content that is associated with at least one of a plurality of reconciliation policies;

determining that the first content comprises a data field associated with at least one of the plurality of reconciliation policies;

responsive to determining that the first content comprises a data field associated with at least one of the plurality of reconciliation policies:

selecting a reconciliation policy based on the metadata tag; and validating the first content against second content from a second source based on the selected reconciliation policy.

16. The system of claim 15, wherein validating the first content against the second content from the second source based on the selected reconciliation policy comprises performing a remediation action associated with the selected reconciliation policy.

17. The system of claim 16, wherein the remediation action comprises:

determining, based on the reconciliation policy, a destination for an alert; and routing the alert to the destination.

18. The system of claim 15, the operations further comprising:

determining a result of the validation matches an alert condition; and transmitting an alert to a user responsive to determining that the result of the validation matches the alert condition.

19. The system of claim 18, the operations further comprising, responsive to determining that the result of the validation does not match the alert condition, storing data representative of the result of the validation to memory.

20. The system of claim 19, wherein the data representative of the result of the validation is indexed and searchable.

* * * * *